United States Patent
Harper et al.

(10) Patent No.: US 7,835,991 B2
(45) Date of Patent: Nov. 16, 2010

(54) DATA FILLING STATION

(75) Inventors: Gregory W. Harper, New York, NY (US); Timothy Davis, Seattle, WA (US)

(73) Assignee: Trans World New York LLC, Albany, NY (US)

( * ) Notice: Subject to any disclaimer, the term of this patent is extended or adjusted under 35 U.S.C. 154(b) by 71 days.

(21) Appl. No.: 12/038,232

(22) Filed: Feb. 27, 2008

(65) Prior Publication Data

US 2009/0030806 A1    Jan. 29, 2009

Related U.S. Application Data

(63) Continuation of application No. 11/776,318, filed on Jul. 11, 2007, now abandoned.

(60) Provisional application No. 60/819,650, filed on Jul. 11, 2006.

(51) Int. Cl.
*G06F 21/00* (2006.01)
(52) U.S. Cl. .......................................... 705/57; 705/59
(58) Field of Classification Search ................. 705/57, 705/59
See application file for complete search history.

(56) References Cited

U.S. PATENT DOCUMENTS

| | | | |
|---|---|---|---|
| 6,671,818 B1 | 12/2003 | Mikurak | |
| 2001/0029605 A1 | 10/2001 | Forbes et al. | |
| 2002/0152396 A1* | 10/2002 | Fox et al. | 713/200 |
| 2006/0123053 A1* | 6/2006 | Scannell | 707/104.1 |
| 2007/0038567 A1* | 2/2007 | Allaire et al. | 705/50 |
| 2007/0038931 A1* | 2/2007 | Allaire et al. | 715/526 |
| 2007/0089151 A1* | 4/2007 | Moore et al. | 725/132 |
| 2008/0172747 A1* | 7/2008 | Hurtado et al. | 726/26 |
| 2009/0041244 A1* | 2/2009 | Lee et al. | 380/259 |
| 2010/0008500 A1* | 1/2010 | Lisanke et al. | 380/201 |

OTHER PUBLICATIONS

International Search Report and Written Opinion issued in PCT/US07/15782 on Feb. 8, 2008, 8 pages.

* cited by examiner

*Primary Examiner*—Pierre E Elisca
(74) *Attorney, Agent, or Firm*—Rothwell, Figg, Ernst & Manbeck, P.C.

(57) ABSTRACT

The present invention provides system and methods for facilitating the acquisition of content. In some embodiment, the systems and method enable a user to acquire and store content on a portable device.

28 Claims, 4 Drawing Sheets

DATA FILLING STATION

This application is a continuation of application Ser. No. 11/776,318, filed Jul. 11, 2007, which claims the benefit of U.S. Provisional Patent Application No. 60/819,650, filed on Jul. 11, 2006, which are incorporated herein by this reference.

BACKGROUND OF THE INVENTION

1. Field of the Invention

The invention relates generally to systems and methods for enabling a user to download content (e.g., audio recordings, video recordings, software, games, news information, or any other content) to a portable player. The content may be DRM protected content or non-DRM content.

2. Discussion of the Background

Portable digital media players are popular. Typically, a user of a portable player acquires content for the player by downloading an asset (e.g., a computer file containing encoded audio and or video data) to a computer, connecting the portable player to the computer, and then transferring a copy of the asset to a storage unit of the player.

What is desired are additional systems and methods for facilitating the acquisition of content.

SUMMARY

The present invention provides systems and method for facilitating the acquisition of content.

In one aspect, the invention provides a system for enabling user of a portable device to acquire content for the portable device.

In some embodiments, the system includes: a client device configured to allow the user to add assets to a virtual shopping cart; a server system in communication with the client device; and a filling station having an operating system and a database that stores settings and/or options that are used by the operating system, wherein the filing station is operable to: (a) communicate with the portable device after the portable device is connected wirelessly or physically to the filling station; (b) automatically store onto the portable device the assets that were placed in the virtual cart by the user after the portable device is connected to the filling station; and (c) automatically restore the database to a previous state after the portable device is disconnected from the filling station. In some embodiments, the filling station is located in a public place, such as a retail store, such that any member of the public may use the filling station.

In another aspect, the invention provides a method for enabling user of a portable device to acquire content for the portable device.

In some embodiments, the method includes: providing a client system that a user can use to place assets in a virtual shopping cart; enabling the user to wirelessly or physically connect a portable device to a filling station; and after the user connects the portable device to the filling station: determining a characteristic of the portable device; if the determined characteristic of the portable device matches a predefined characteristic, then providing to the user an option to obtain the assets in the virtual shopping cart in a non-protected form; if the user accepts the option, then storing onto the portable device a non-DRM asset corresponding to an asset that was placed in the virtual shopping cart by the user.

In some embodiments, the method includes: enabling a user to wirelessly or physically connect a portable device to a filling station, wherein the filling station comprises a computer and a storage unit that stores a database that contains settings and/or options that are used by an operating system running on the computer; after the user connects the portable device to the filling station, storing onto the portable device an asset that was placed in a virtual shopping cart by the user; and automatically restoring the database to a previous state after the portable device is disconnected from the filling station.

The above and other aspects and embodiments of the invention are described below with reference to the drawings.

DETAILED DESCRIPTION OF PREFERRED EMBODIMENTS

Figure 1:
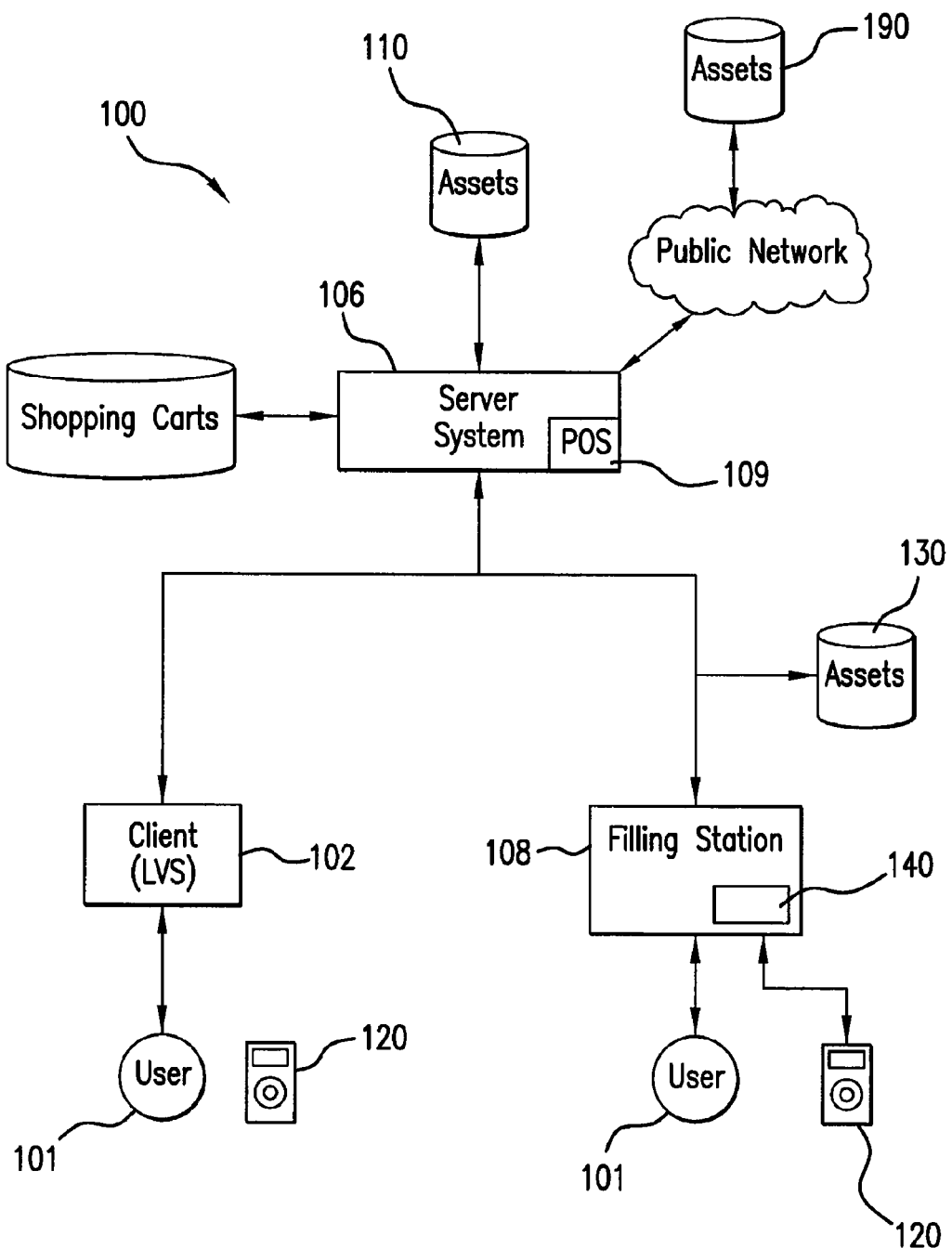
FIG. 1 is a schematic of a system 100 according to an embodiment of the invention.

FIG. 1 is a schematic of a system 100 according to an embodiment of the invention. As shown in FIG. 1, system 100 includes a client computer system 102 (hereafter referred to as "listening and viewing station" or "LVS"), a server system 106, which may include one or more servers that may or may not be co-located and which may include a point-of-sale system 109, and a computer filling station 108, which may include one or more personal computers running the Windows® operating system or other operating system and/or other software for implementing the functionality described herein.

In one embodiment, multiple LVSs 102 are distributed throughout a retail store, which may contain physical assets that are available for purchase, and filling station 108 is also located in the retail store. In embodiments where filling station 108 is located in a public place (e.g., a retail store), filling station 108 is a public system (i.e., any member of the public may use filling station as described herein). A description of certain features and functionality of LVS 102 and server system 106 can be found in co-pending U.S. patent application Ser. No. 11/025,149, filed Dec. 30, 2004 and published as Pub. No. 2005/0144091, the content of which is incorporated herein.

Figure 2A:
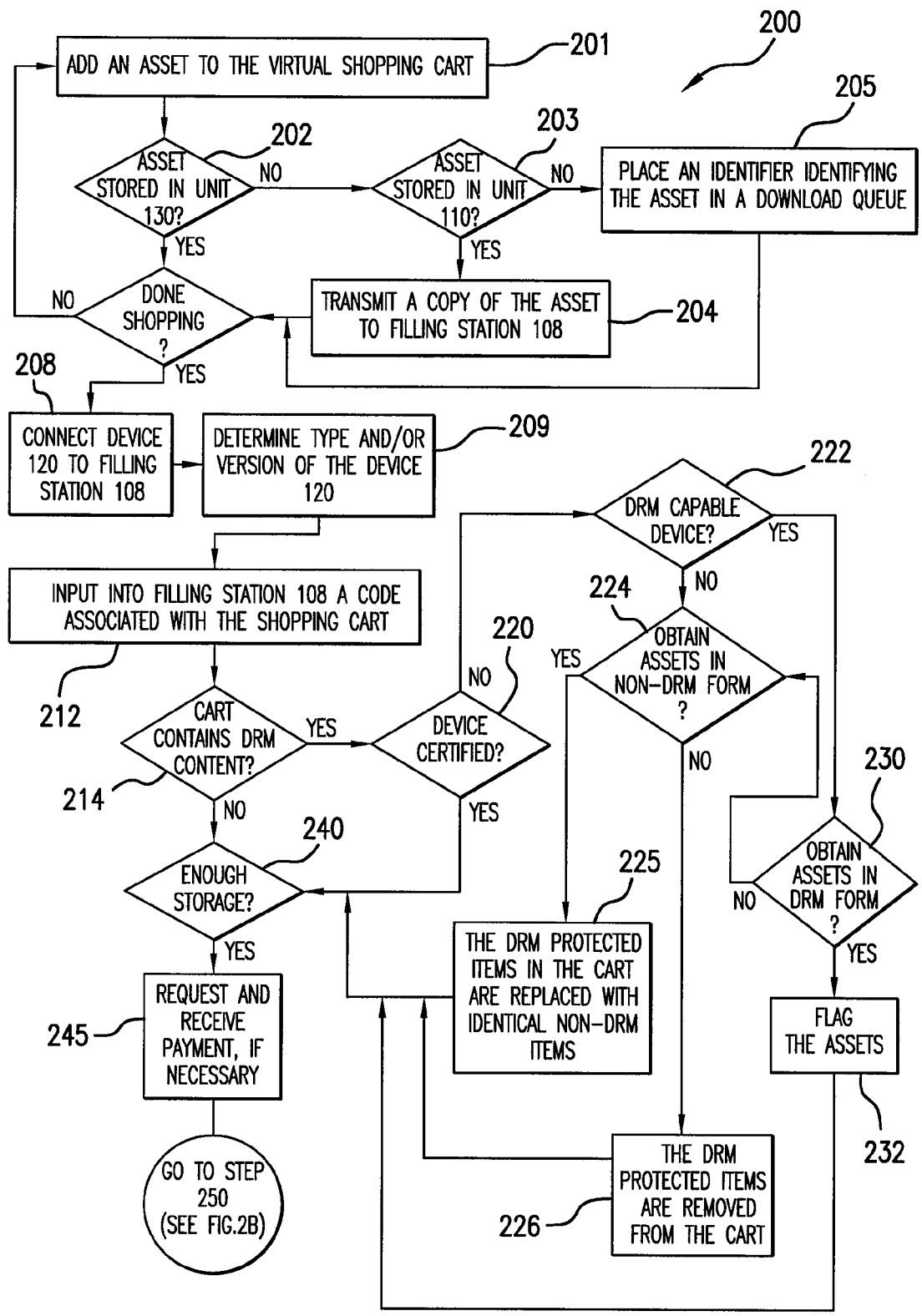
FIGS. 2A-B contain a flow chart illustrating a process according to an embodiment of the invention.
Figure 2B:
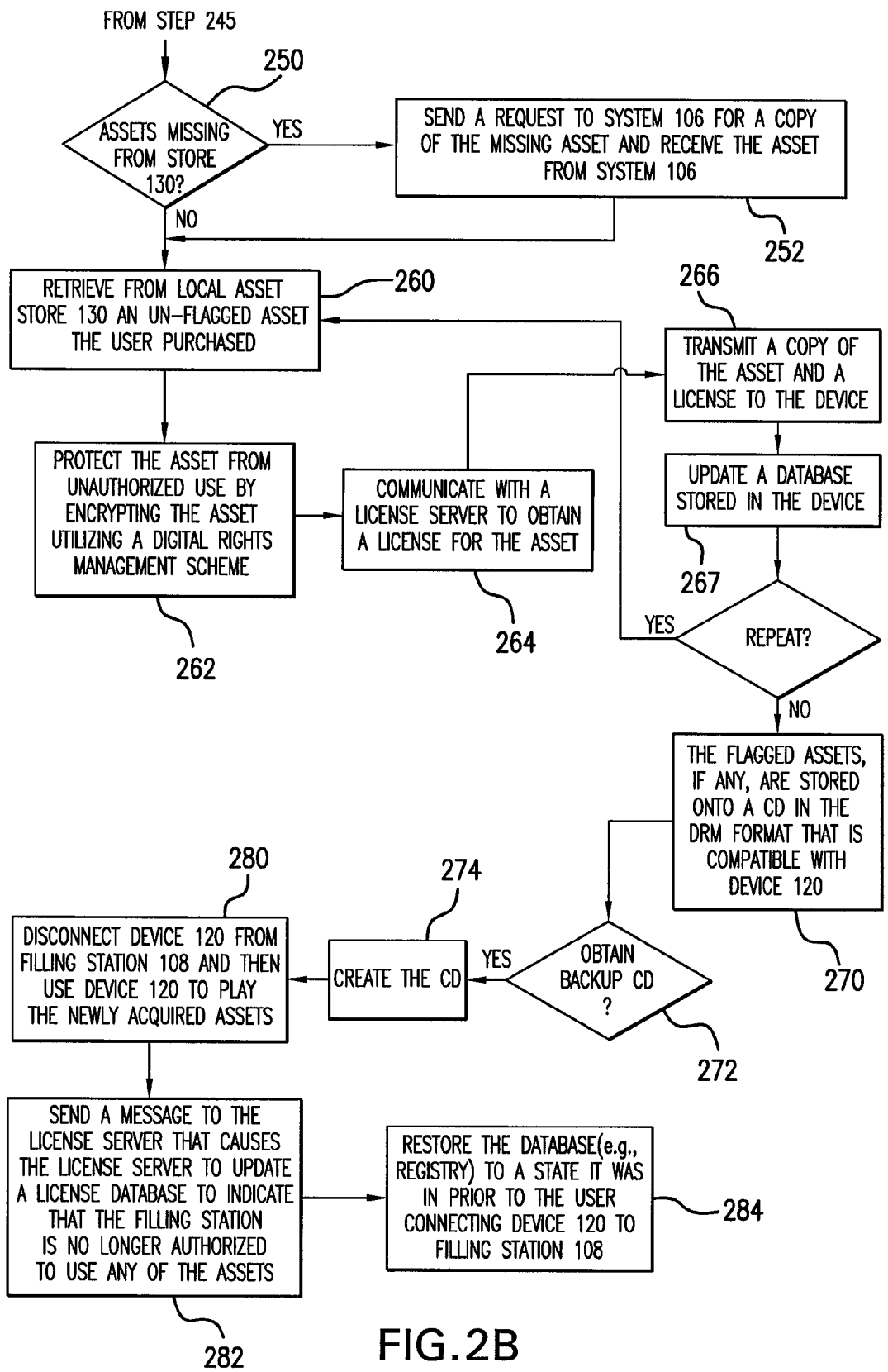

Referring now to FIG. 2, FIG. 2 is a flow chart illustrating a process 200 for acquiring DRM protected assets and/or non-DRM assets using system 100.

Process 200 may begin in step 201 where user 101 may use LVS 102 to "add" one or more assets to a virtual shopping cart. In some embodiments, when a user "adds" an asset to the virtual shopping cart, system 100 inserts an identifier corresponding to the asset into a database record corresponding to the virtual shopping cart. Some, none or all of the assets "added" to the cart may be copy and/or use protected using a digital rights management (DRM) scheme. Such assets are referred to as DRM protected assets. Assets that are not copy and/or use protected are referred to as non-DRM asset. An example of a non-DRM asset is an MP3 file or AAC file or WMA file.

In step 202, after (e.g., immediately after) an asset is "placed" in the cart, server system 106 may determine whether a copy of the asset is stored in a local asset repository 130. If it is, process 200 may proceed to step 208 or back to 201. If it is not stored in repository 130, system 106 may determine whether a copy of the asset is stored in a local asset repository 110 (step 203). If it is stored in local asset repository 110, then system 106 may transmit a copy of the asset to filling station 108, which, stores the asset in a local repository 130 (step 204), otherwise, system 106 may place an identifier identifying the asset in a download queue (step 205). An asset that is identified by an asset identifier that has been placed in the download queue is downloaded from a central repository 190 once the identifier reaches the top of the queue. After the asset is downloaded (or while it is being downloaded), its corresponding identifier is removed from the top of queue, thereby causing the next identifier in the queue to reach the top of the queue.

Local asset store 130 may include, for example, an internal or external hard drive, flash drive, flash memory, read-only memory (ROM), random access memory (RAM), or any other storage unit. In some embodiments, the assets are encrypted prior to being transmitted to filling station 108 so that the assets stored in local store 130 are encrypted. In some embodiments, the assets are not encrypted.

In step 208, which typically occurs after the user is finished adding assets to his/her shopping cart, the user may proceed to the location of filling station 108 and "connect" his/her portable device 120 (e.g., a portable music player or portable storage device such as a USB memory device) to filling station 108 so that filling station 108 and device 120 can communicate with each other. The portable device 120 may be either physically or wirelessly connected to filling station 108. Accordingly, filling station 108 includes an interface 140 for connecting with device 102. For example, interface 140 may include a physical interface (e.g., a USB port or other physical communication interface) and/or a wireless interface (e.g., a Bluetooth transceiver, a wifi transceiver and/or other wireless communication interface).

In step 209, after the user connects device 120 with filling station 108, filling station 108 may communicate with device 120 to determine, for example, the device type and/or version of device 120. For example, in step 209, filling station may communicate with device 120 to determine whether the device is an iPod® and, if it is an iPod, which version of the iPod it is.

In step 212, the user may input into filling station 108 a code associated with the user's shopping cart (for this purpose, filling station 108 may include a user input device (e.g., keyboard, touch screen, mouse, etc.)). In some embodiments, this code may be a customer account number (e.g., a code associated with a customer loyalty card) or any other code associated with the shopping cart (e.g., the name of the shopping cart). Inputting the code enables system 100 to retrieve the user's cart, calculate an amount owed, if any, and determine the assets that are in the cart.

In step 214, filling station 108 determines whether any of the assets in the cart correspond to DRM protected content. If so, the process may proceed to step 220, otherwise the process may proceed to step 240.

In step 220, filling station 108 may determine whether device 120 is a certified DRM device. For example, filling station 108 may determine, based on information received in step 209, whether device 120 is a FairPlay device (i.e., a device, such as the iPod®, that implements the FairPlay digital rights management technology developed by Apple Inc.) or a "PlaysForSure" device, which is a device that has been certified to work with Microsoft Windows and with Microsoft's branded digital rights management. If it is a certified DRM device, then the process may proceed to step 240, otherwise it may proceed to step 222.

In step 222, determines whether device 120 is a non-DRM device (e.g., a device that does not implement any DRM scheme) or a DRM device. If it is determined that device 120 is a non-DRM device, then process 200 may proceed to step 224, otherwise it may proceed to step 230.

In step 224, filling station 108 informs the user that the DRM protected assets that are in the users cart are not compatible with the user's device 120 and gives the user the option to obtain the those DRM assets in a non-DRM form. If the user chooses this option, the DRM protected items in the cart are replaced with identical non-DRM items (step 225) and the user may be charged a greater amount for those non-DRM items, otherwise, the DRM protected items are simply removed from the cart (step 226). After step 225 and 226, the process may proceed to step 240.

In step 230, filling station 108 informs the user that the DRM protected items that are in the users cart are not compatible with the user's device 120 and gives the user the option to obtain those DRM items in a non-DRM form or obtain them on a CD (or other storage device) in the DRM form that is compatible with the device 120. For example, in embodiments where system 100 does not support the iTunes DRM scheme, when a user connects an Apple iPod to filling station 108, filling station 108 may give the user the option to obtain one or more of the items that are in the user's cart in the iTunes format on a CD. If the user chooses to obtain the DRM items in non-DRM form, then the DRM protected items in the cart are replaced with identical non-DRM items (step 225). If the user chooses to obtain the DRM items in the DRM format that is compatible with device 120, then those items are flagged, thereby indicating that the items should be burned to a CD in the appropriate DRM format (step 232). If the user chooses neither of these options, then the DRM protected items are simply removed from the cart (step 226).

In step 240, filling station 108 determines whether device 120 has sufficient free storage capacity to store the assets that are in user's shopping cart. If filling station 108 determines that device 120 does not have the necessary storage capacity, then filling station may display an error message to user 101.

In step 245, filling station requests and receives "payment" from the user if payment is required (in some cases, a user may acquire assets free of charge). In some embodiments, the user may have a customer card that has an account code printed thereon or stored therein. Thus, in these embodiments, a user may user his/her customer card to make payment. For example, the account code on/in the card may be inputted into the filling station 108, which may communicate the code to server system 106 (e.g., point-of-sale (POS) system 109), which may then charge the amount owed to an account associated with the account code. Accordingly, filling station 108 may include a user input device (e.g., keyboard, touch screen, mouse, etc.) for receiving input from the user. In some embodiments, to ensure that the holder of the card is authorized to use the card, system 100 may first prompt the user for a PIN prior to charging the amount owed to the account. In some embodiments, filling station 108 may have a credit card swipe or other device for receiving payment from the user.

In step 250, filling station 108 determines whether there are assets in the cart that are not stored in repository 130. If there is such an asset, the filling station 108, may send a request to system 106 for a copy of the asset and receive the asset from system 106 (step 252). In response to receiving the request, system 106 may immediately download the asset from central repository 190 if the asset is not stored in local repository 110.

In step 260, filling station 108 retrieves from local asset store 130 an un-flagged asset the user purchased. If necessary, filling station 108 decrypts the received asset. In step 262, filling station 1088 may protect the retrieved asset from unauthorized use by encrypting the asset utilizing a digital rights management scheme. In step 264, filling station 108 may communicate with a license server to obtain a license for the asset. In some embodiments step 264 may need not be performed because licenses may be pre-stored in filling station 108 or the user may not need a license to use and/or copy the asset. In step 266, filling station 108 transmits a copy of the retrieved asset and a license, if necessary, to the user's device 120.

In step 267, filling station 108 may add meta-data to the device 120 by, for example, updating a database stored on the user's device. For example, in step 267, filling station 108 may cause meta-data to be added to a database stored on the user's device, where the data corresponds to the asset stored on the device in step 266. This meta-data may, for example, include information about the asset. For instance, if the asset is a song, the meta-data may include the title of the song and the artist who recorded the song. In some embodiments, the data may include a pointer to the asset that was stored in step 266 so that software running on the device can locate the asset when a user requests the device to play the asset. Because the format of the database may vary depending on the version and/or type of device 120 and/or because different devices 120 may require the meta-data to be in different formats, in some embodiments, filling station 108 determines the correct protocol (e.g., data format) to use when loading the meta-data onto device 120. For example, before updating a database, filling station 108 may communicate with device 120 to determine the type and/or version of device 120 (see step 209) and then may use this information to select the protocol with which to communicate with the device in order to update the database.

Steps 260-267 are repeated so that all of the purchased un-flagged assets are transferred to device 120.

In step 270, the flagged assets, if any, are stored onto a CD in the DRM format that is compatible with device 120.

In step 272, filling station 108 may ask the user if the user would like to have a backup CD (i.e., a CD that stores the same content that was placed in device 120). If the user would like a backup CD, the user's account may be charged and filling station 108 causes a CD to be created that contains the required content (step 274).

In step 280, the user may disconnect device 120 from filling station 108 and then use device 120 to play the newly acquired assets. Accordingly, in this manner, the user can obtain assets for his/her portable device 120.

In step 282, filling station 108 may send a message to the license server that causes the license server to update a license database to indicate that the filling station 108 is no longer authorized to use any of the DRM assets copied to device 120.

In step 284, if filling station 108 has a database (e.g., a registry) that was modified as a result of the user connecting the device 120 to the filling station 108, then, immediately or a short time after the user disconnects device 130 from filling station 108, filling station 108 may restore the database to a state it was in prior to the user connecting device 120 to filling station 108. For example, if filling station 108 includes a Windows computer to which the user connected device 120 and information was added to the Windows registry (i.e., the database that stores settings and options that are used by the operating system) as a result, then filling station 108 may automatically remove the information from the registry after the user disconnects device 120 from the filling station 108. Depending on the implementation of filling station 108, this may be a critical feature of the filling station 108 because, in some implementations, if the information is not removed from the registry after a certain number of user's have used filling station 108, then filling station may become non-operational after a period of use.

In some embodiments (e.g., when the virtual shopping cart contains video assets), after the user connects device 120 with filling station 108 and before filling station stores an un-flagged asset on device 120, filling station 108 may determine the capabilities of device 120 so that if device 120 is capable of playing high-resolution content (e.g., high-resolution videos), filling station 108 may give the user a choice between obtaining the asset in a high-resolution format or a low-resolution format. If the user selects high-resolution, then in step 260 filling station 108 will retrieve the high-resolution asset, otherwise it may retrieve the lower resolution asset.

Figure 3:
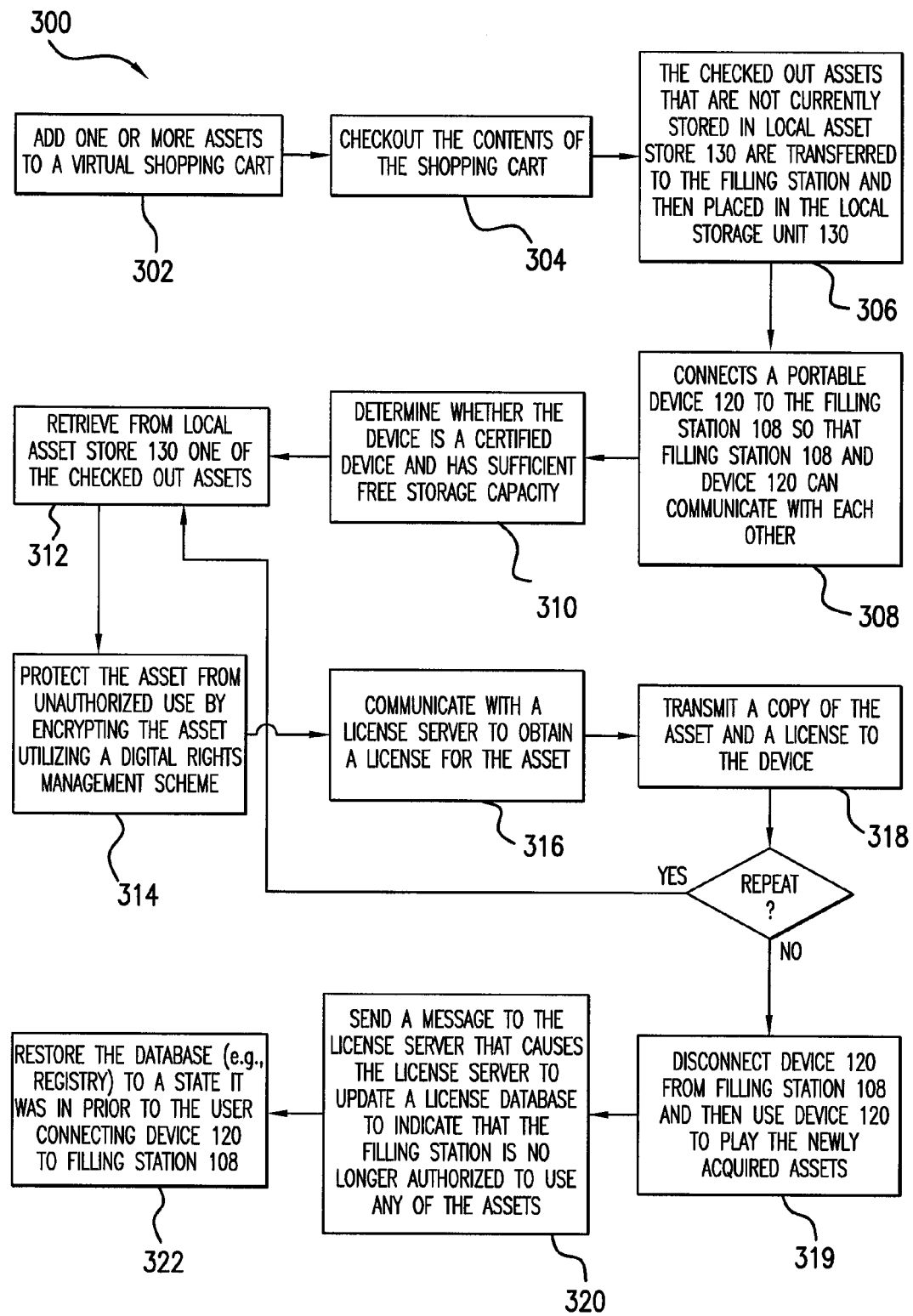
FIG. 3 contains a flow chart illustrating a process according to an embodiment of the invention.

Referring now to FIG. 3, FIG. 3 is a flow chart illustrating a process 300 for acquiring DRM protected assets using system 100.

Process 300 may begin in step 302 where user 101 may use LVS 102 to add one or more DRM protected assets to a virtual shopping cart.

In step 304, the user checkouts the shopping cart (i.e., the user indicates that he/she is finished shopping and would like to obtain the assets that he/she placed in his/her cart).

If payment is required at this time, the user may pay for the items at the LVS 102, at a cash register or at the filling station 108. In some embodiments, the user may have a customer card that has an account code printed thereon or stored therein. Thus, in these embodiments, a user may user his/her customer card to make payment. For example, the account code on/in the card may be inputted into the LVS or filling station 108, which may communicate the code to server system 106 (e.g., point-of-sale (POS) system 109), which may then charge the amount owed to an account associated with the account code. In some embodiments, to ensure that the holder of the card is authorized to use the card, system 100 may first prompt the user for a PIN prior to charging the amount owed to the account.

If the user checks out the cart at filling station 108, the user may first input into filling station 108 a code associated with the user's shopping cart (for this purpose, filling station 108 may include a user input device (e.g., keyboard, touch screen, mouse, etc.)). In some embodiments, this code may be a customer account number or any other code associated with the shopping cart. Inputting the code enables system 100 to retrieve the user's cart and calculate an amount owed, if any. Filling station 108 may have a credit card swipe or other device for receiving payment from the user.

If the user checks out the cart using the LVS or a POS system, the user may be given a unique security code. The user may then be instructed to proceed to filling station 108 and input into the filling station the received code. If the user is not given a security code after checking out the shopping cart, then the user may be instructed to proceed to the filling station 108 and input a code associated with the shopping cart.

In step 306, which may occur after the user has checked out his/her cart, the assets from the cart that are not currently stored in a local asset store 130 of filling station 108 are transferred to the filling station 108 and then placed in the storage unit 130. For example, server system 106 may include or have access to an asset store 110 that stores a multitude of different assets and system 106 may retrieve the appropriate assets from store 110 and transmit the assets to filling station 108, which upon receiving the assets stores them in local store 130. As discussed above, if an asset is not stored in either store 110 or store 130, system 106 may retrieve the asset from store 190.

In step 308, the user may connect portable device 120 to filling station 108 so that filling station 108 and device 120 can communicate with each other.

In step 310, filling station 108 may communicate with device 120 to determine whether it is certified. For example, filling station 108 may communicate with device 120 to determine whether it is a "PlaysForSure" device, which is a device that has been verified to work with Microsoft Windows and with Microsoft's branded digital rights management, or a FairPlay device.

Additionally, in step 310, filling station 108 may communicate with device 120 to determine whether device 120 has the free storage capacity to store the assets from the user's shopping cart. If filling stations determines that device 120 is not certified or does not have the necessary storage capacity, then filling station may display an error message to user 101 or may give the user the option to acquire non-DRM assets.

For example, if device 120 is not certified, but station 108 determines that device 120 is capable of playing or storing MP3 files, then the user may be given the option to download un-protected MP3 files to device 120. For instance, a list of such MP3 songs may be displayed on a display device of station 108 and the user may be given the option to select one or more of the songs from the list; station 108, in response to the user selecting songs from the list, may transmit a copy of each song to device 120. The user may be charged more for non-DRM content.

As another example, system 100 may give the user the option to have the purchased content stored onto an optical storage medium (e.g., a CD or DVD or other like storage medium). This option may be given to the user regardless of whether system 100 determines device 120 to be certified or not. Accordingly, if the user has purchased a set of music tracks, the user may be given the option to have the music tracks burned to a CD, DVD, etc. In addition to placing the music tracks on the CD, meta-information associated with each track (e.g., information identifying the title of the track, artist information, album/CD information, etc.) may also be stored on the storage medium along with the track.

If device 102 is certified and has sufficient free storage capacity, the process 300 may proceed to step 312. In step 312, filling station 108 retrieves from local asset store 130 an asset that the user had checked out. If necessary, filling station 108 decrypts the asset. In step 314, filling station may protect the asset from unauthorized use by encrypting the asset utilizing a digital rights management scheme. In step 316, filling station 108 may communicate with a license server to obtain a license for the asset. In some embodiments step 316 may not need to be performed because licenses may be pre-stored in filling station 108. In step 318, filling station transmits a copy of the asset and a license to the user's device 120. Steps 312-218 are repeated so that all of the checked out assets are transferred to device 120. In step 319, the user may disconnect device 120 from filling station 108 and then use device 120 to play the newly acquired assets. Accordingly, in this manner, the user can obtain assets for his/her portable device 120.

In step 320, filling station 108 may send a message to the license server that causes the license server to update a license database to indicate that the filling station 108 is no longer authorized to use any of the assets.

In step 322, if filling station 108 has a database (e.g., a registry) that was modified as a result of the user connecting the device 120 to the filling station 108, then filling station 108 may restore the database to a state it was in prior to the user connecting device 120 to filling station 108.

Referring back to FIG. 1, although LVS 102, server system 106 and filling station 108 are shown as being separate entities it is contemplated that a single device (e.g., a computer programmed to implement the features disclosed herein) can be used to implement features of LVS 102, server system 106 and/or filling station 108. For example, in some embodiments, filling station 108 may function not only as a data filling station as described herein, but also functions as a device that enables a user to shop for items in the same manner as described above with respect to LVS 102. Additionally, in some embodiments, filling station 108 has the capabilities to perform many of or all of the same functions as server system 106.

While various embodiments/variations of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed simultaneously.

What is claimed is:

1. A system for enabling a user to add content to a portable device, comprising:
    a client device configured to allow the user to add assets to a virtual shopping cart;
    a server system in communication with the client device;
    a filling station having an operating system and a database that stores settings and/or options that are used by the operating system, wherein the filling station is operable to: (a) communicate with the portable device after the portable device is connected wirelessly or physically to the filling station; (b) automatically store onto the portable device the assets that were placed in the virtual cart by the user after the portable device is connected to the filling station; (c) automatically restore the database to a previous state after the portable device is disconnected from the filling station; and
    a storage unit that stores assets, wherein the storage unit is connected to and/or physically part of the filling station, wherein
    the filling station is further operable to:
    (d) receive a code, wherein a list of assets is associated with the code; (e) determine whether an asset associated with the code is stored in the storage unit; (f) retrieve the asset from the storage unit; and (g) store a copy of the asset on the portable device.

2. The system of claim 1, wherein the operating system is a Windows operating system and the database is a Windows registry.

3. The system of claim 2, wherein the previous state is the state in which the database was in just prior to when the portable device was connected to the filling station.

4. The system of claim 1, wherein the filling station is configured to communicate with the portable device wirelessly.

5. The system of claim 1, wherein the filling station is configured to communicate with the portable device over a cable.

6. The system of claim 1, wherein the code is an identifier that identifies the virtual shopping cart.

7. The system of claim 1, wherein the filling station is configured to transmit a message to the server system in response to the filling station determining that one or more of the assets associated with the code is not stored in the storage unit, wherein the message comprises an identifier identifying one of the one or more assets.

8. The system of claim 7, wherein the server system is configured to retrieve the asset identified in the message and transmit the asset to the filling station in response to receiving the message.

9. The system of claim 1, wherein the filling station is configured to automatically restore the database to the previous state immediately after the portable device is disconnected from the filling station.

10. The system of claim 1, wherein the server system is configured to transmit an asset to the filling station in response to the user adding the asset to the virtual shopping cart.

11. The system of claim 1, wherein the server system is configured such that, in response to the user adding an asset to the virtual shopping cart, the server system will determine whether the asset is stored in a storage unit accessible to the filling station and transmit the asset to the filling station if the asset is not stored in a storage unit accessible to the filling station.

12. The system of claim 1, wherein the server system is configured to place an identifier identifying an asset in a download queue in response to the user adding the asset to the virtual shopping cart.

13. The system of claim 1, wherein the server system is configured such that, in response to the user adding an asset to the virtual shopping cart, the server system will determine whether the asset is stored locally and place an identifier identifying the asset in a download queue if the asset is not stored locally.

14. The system of claim 1, wherein the filling station is located in a public place such that any member of the public may use the filling station.

15. The system of claim 1, wherein the filling station is configured to determine the type and/or version of the portable device upon the portable device being connected to the filling station.

16. A method, comprising:
enabling a user to wirelessly or physically connect a portable device to a filling station, wherein the filling station comprises a computer and a storage unit that stores a database that contains settings and/or options that are used by an operating system running on the computer;
after the user connects the portable device to the filling station receiving a code at the filling station, wherein a set of assets is associated with the code and each asset in the set was placed in a virtual shopping cart by the user;
determining whether an asset included in the set is not stored in a local asset storage unit, wherein the local asset storage unit is connected to and/or part of the filling station;
in response to determining that the asset included in the set is not stored in the local asset storage unit, transmitting a message, from the filling station, to a server system, wherein the message comprises an identifier identifying the asset;
after transmitting the message, receiving the asset from the server system;
after receiving the code, storing onto the portable device an asset that was placed in a virtual shopping cart by the user; and
automatically restoring the database to a previous state in response to the portable device being disconnected from the filling station.

17. The method of claim 16, wherein the operating system is a Windows operating system and the database is a Windows registry.

18. The method of claim 16, wherein the previous state is the state in which the database was in just prior to when the portable device was connected to the filling station.

19. The method of claim 16, wherein the code is an identifier that identifies the virtual shopping cart.

20. The method of claim 16, further comprising retrieving the asset identified in the message and transmitting, from the server system, to the filling station the identified asset in response to receiving the message.

21. The method of claim 16, wherein the step of automatically restoring the database occurs immediately in response to the portable device being disconnected from the filling station.

22. The method of claim 16, further comprising providing a client computer system that the user can use to place assets in the virtual shopping cart.

23. The method of claim 22, further comprising transmitting, from a server system, to the filling station an asset in response to the user adding the asset to the virtual shopping cart.

24. The method of claim 22, further comprising:
determining whether an asset is stored in a storage unit accessible to the filling station; and
transmitting the asset to the filling station in response to determining that the asset is not stored in a storage unit accessible to the filling station, wherein
the determining step occurs in response to the user adding the asset to the virtual shopping cart.

25. The method of claim 22, further comprising placing an identifier identifying an asset in a download queue in response to the user adding the asset to the virtual shopping cart.

26. The method of claim 22, further comprising:
determining whether an asset is stored locally; and
placing an identifier identifying the asset in a download queue in response to determining that the asset is not stored locally, wherein
the determining step occurs in response to the user adding the asset to the virtual shopping cart.

27. The method of claim 16, wherein the filling station is located in a public place such that any member of the public may connect a portable device to the filling station.

28. The method of claim 16, further comprising determining the type and/or version of the portable device upon the portable device being connected to the filling station.

* * * * *